US007373651B2

(12) United States Patent
Palazzo et al.

(10) Patent No.: US 7,373,651 B2
(45) Date of Patent: May 13, 2008

(54) METADATA STRUCTURE FOR PROVIDING ACCESS TO EPG FEATURES FROM WITHIN BROADCAST ADVERTISEMENTS

(75) Inventors: Francis D. Palazzo, Dresher, PA (US); Bruce Plotnick, Jamison, PA (US); Joel I. Boyarski, Philadelphia, PA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 614 days.

(21) Appl. No.: 10/022,651

(22) Filed: Dec. 17, 2001

(65) Prior Publication Data

US 2004/0163111 A1 Aug. 19, 2004

(51) Int. Cl.
*G06F 3/00* (2006.01)
*G06F 13/00* (2006.01)
*H04N 5/445* (2006.01)

(52) U.S. Cl. .............................. 725/42; 725/32; 725/36

(58) Field of Classification Search ............ 725/39–43, 725/46, 50–51, 54, 56, 139, 32, 36, 58, 61, 725/104, 135, 47, 112, 136, 55, 134, 142; 709/229–231; 715/721
See application file for complete search history.

(56) References Cited

U.S. PATENT DOCUMENTS

| | | | |
|---|---|---|---|
| 5,694,176 A | | 12/1997 | Bruette et al. |
| 5,805,763 A | * | 9/1998 | Lawler et al. ................. 725/40 |
| 6,025,837 A | * | 2/2000 | Matthews et al. .......... 715/721 |
| 6,081,263 A | | 6/2000 | LeGall et al. |
| 6,205,485 B1 | * | 3/2001 | Kikinis ........................ 709/231 |
| 6,317,885 B1 | * | 11/2001 | Fries ............................. 725/37 |
| 6,442,755 B1 | * | 8/2002 | Lemmons et al. ............. 725/47 |
| 6,675,385 B1 | * | 1/2004 | Wang ............................ 725/39 |
| 6,678,733 B1 | * | 1/2004 | Brown et al. ................ 709/229 |
| 6,732,369 B1 | * | 5/2004 | Schein et al. ................. 725/39 |
| 6,799,327 B1 | * | 9/2004 | Reynolds et al. ............. 725/42 |
| 2002/0116471 A1 | * | 8/2002 | Shteyn ........................ 709/217 |

OTHER PUBLICATIONS

"Personalized EPG Using User Preference MetaData", Murat Koray Akkaya; (www.nhk.or.jp/strl/publica/bt/en/bk-r-fe.html); No. (Spring 2001).*
BBC; R&D White Paper, WHP 014; Sep. 2001; "TV Gets Personal" by A. Oliphant and B.Scudamore; Published in the IEE Review Sep. 2001.*
TV-Anytime: metadata. Aprelilminary specification on schedule! by Jean-Pierre Evain; EBU Technical Department—EBU Technical Review—Sep. 2000 (14 pages).*
The TV-Anytime Forum: Requirements Series: R-5 on: Rights Management and Protection Requirements. Document TV039r7—Date: Dec. 15, 2000.*
Written Opinion, PCT/US02/40164, filed Dec. 12, 2002, corresponding to U.S. Appl. No. 10/022,651.

* cited by examiner

*Primary Examiner*—Ngoc Vu
(74) *Attorney, Agent, or Firm*—Patterson & Sheridan, LLP (57) ABSTRACT

A data structure stored on computer readable media is presented comprising one or more data tags, each data tag used to provide information regarding a broadcast advertisement. Also provided are one or more electronic program guide action tags, each electronic program guide action tag used to define a valid electronic program guide feature that may be accessed from within the broadcast advertisement. The data structure is operative to provide a link between the broadcast advertisement and an electronic program guide to provide access to electronic program guide features defined by the electronic program guide action tags from within the broadcast advertisement.

20 Claims, 5 Drawing Sheets

Fig. 1

```
<purchaseableEvent>
    <showDate>06162001</showDate>
    <showTime>21:00</showTime>
    <network>PPV9</network>
    <price>19.95</price>
    <synopsis>WWF match between
              Smith and Hall to decide
              once and for all the super
              heavyweight champion of
              the world</synopsis>
</purchaseabeEvent>
```

Fig. 2

```
<interactiveAdvertisement>
    <adIdentifier>0000001</adIdentifier>
    <webAddress>www.product.net</webAddress>
    <productId>adters2343sf</productId>
    <epgAction>
        <tuneAction>channel 9</action>
        <storeAction>memory device</action>
        <recordAction>local DVR</action>
    </epgAction>
</interactiveAdvertisement>
```

METADATA STRUCTURE FOR PROVIDING ACCESS TO EPG FEATURES FROM WITHIN BROADCAST ADVERTISEMENTS

RELATED APPLICATION

This application is related to commonly owned applications:
"SYSTEM AND METHOD FOR DIGITAL TV NAVIGATOR AND EPG", application Ser. No. 60/340,329, said application filed on Dec. 13, 2001 and hereby incorporated by reference in its entirety.
"SYSTEM AND METHOD FOR PROVIDING ACCESS TO EPG FEATURES FROM WITHIN BROADCAST ADVERTISEMENTS", application Ser. No. 10/022,649, said application filed on Dec. 17, 2001 and hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to interactivity in broadcast systems. More particularly, the present invention relates to a system and method for providing interactive advertisements and other promotionals delivered over a broadcast network and presented in both full screen advertisements and within an electronic program guide.

Various audio/video navigation and electronic program guide systems are known to those skilled in the art. These systems typically provide some degree of interactive functionality whereby advanced navigation features are made available to a user of such a system. For example, electronic program guides are provided whereby a user may explore programming available at a variety of future times. Likewise, advanced information may be provided to users as they navigate among the channels that comprise the available programming.

Digital television programming is transmitted on MPEG-2 transport streams, each stream combining multiple channels of programming as a single multiplex. The MPEG standards are an evolving set of standards for video and audio compression developed by the Moving Pictures Experts Group (MPEG). MPEG-2 was designed for coding interlaced images at transmission rates above four million bits per second. In addition to television, MPEG-2 is used to encode data for the digital versatile disk (DVD) media format. A cable system, for example, combines multiple transport multiplexes to form a channel lineup. Each channel typically carries programming comprised of one video stream and at least one audio stream. In addition, a program may combine closed-caption text or other auxiliary information into a broadcast by transmitting a "private data stream".

With the advent of digital television, the introduction of electronic program guides has become prevalent. An electronic program guide allows users to electronically browse TV listings. Moreover, these guides provide functionality to tune selected programming, set reminders, or select programs for current or future recording. As users adjust to using these features, they will find it desirable to have access to them during or within broadcast advertisements, for example, commercials played during scheduled programming or advertisements appearing within an EPG.

There is thus a need for a system and method whereby the interactive features of an electronic program guide are available from within broadcast advertisements presented as either full screen advertisements or within the electronic program guide.

BRIEF SUMMARY OF THE INVENTION

A data structure stored on computer readable media is presented comprising one or more data tags, each data tag used to provide information regarding a broadcast advertisement. Also provided are one or more electronic program guide action tags, each electronic program guide action tag used to define a valid electronic program guide feature that may be accessed from within the broadcast advertisement. The data structure is operative to provide a link between the broadcast advertisement and an electronic program guide to provide access to electronic program guide features defined by the electronic program guide action tags from within the broadcast advertisement. The data structure may be formatted for broadcast in combination with the broadcast advertisement to one or more set top terminals.

According to embodiments of the invention each of the one or more electronic program guide action tags are marked by an opening and a closing tag. The opening and closing tag are operative to define a data type for each of the one or more electronic program action tags. The opening and closing tag may enclose the valid electronic program guide feature in order to delimit the valid electronic program guide feature from another valid electronic program guide feature. Advantageously, the valid electronic program guide feature may comprise an electronic program guide action parameter of a data type corresponding to the opening and closing tag. Exemplary electronic program guide action parameters comprise, but are not limited to, a remote or local location to store the broadcast advertisement, pay-per-view purchase information, information to set a future reminder for a program, or a network address, such as an Internet address.

As stated above, the data structure comprises data tags, which may comprise pay-per-view information. Pay-per-view information may include program date information, program time information, and program channel information. Data tags comprising the data structure of the present invention may also comprise a unique advertisement identifier or a unique product identifier. These identifiers may be used to collection additional program information from a set of guide data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
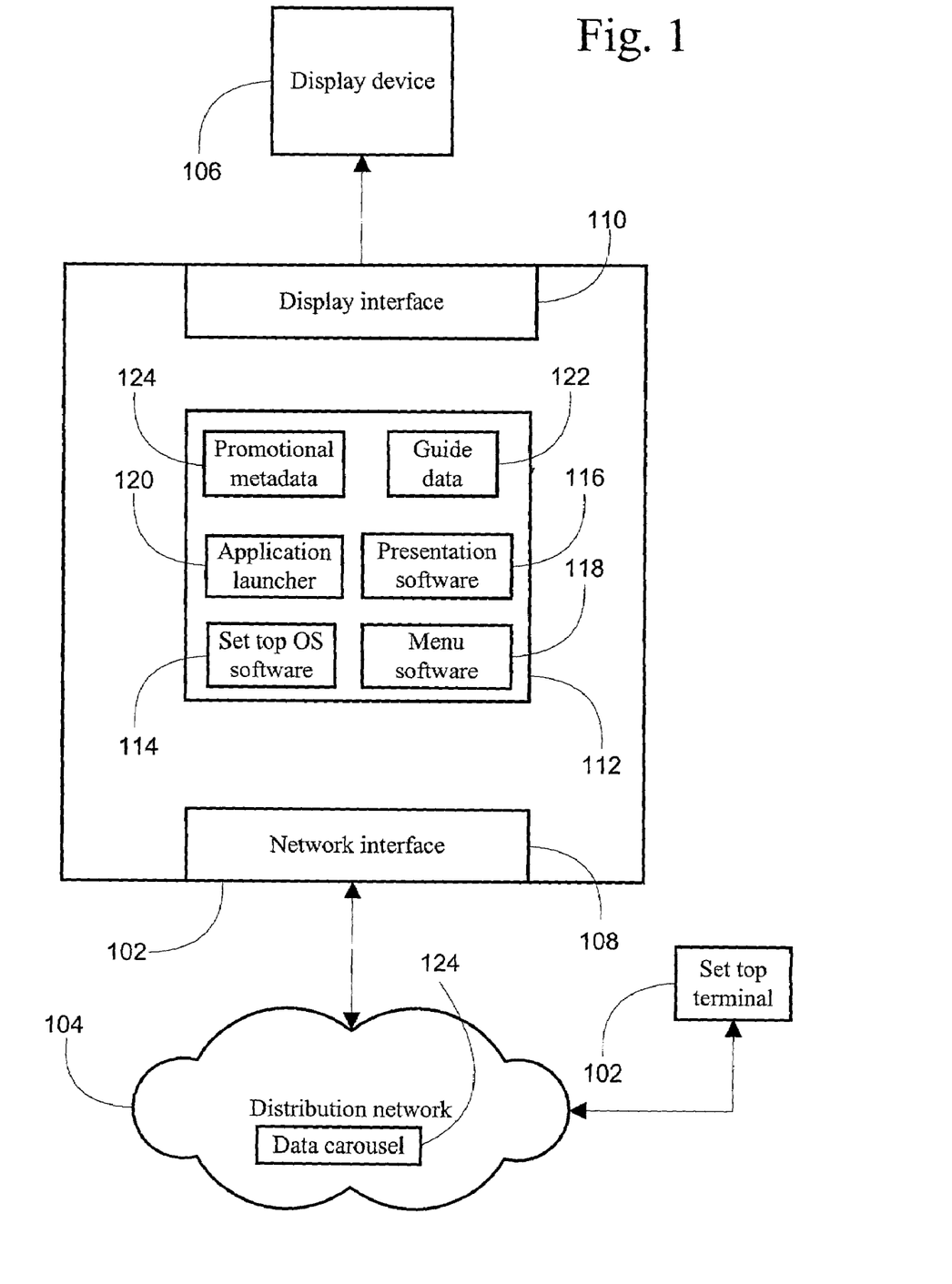
FIG. 1 is a block diagram presenting a configuration of hardware components for providing access to the interactive features of an electronic program guide from broadcast advertisements according to one embodiment of the present invention.

With reference to FIGS. 1 through 6, embodiments of the invention are presented. Turning to FIG. 1, a block diagram is presented that illustrates one embodiment of the hardware and software components used to provide access to the interactive features of an electronic program guide from within broadcast advertisements. A distribution network 104 is used to distribute digital and/or analog audio and video data to one or more subscribing customers' set top terminals 102. According to some embodiments, the distribution network 104 comprises a coaxial infrastructure, a fiber optic infrastructure, a hybrid fiber-coax infrastructure, a wireless infrastructure, or a combination of these and other delivery technologies well known to those skilled in the art. Audio and video data is broadcast across the distribution network 104 to a subscriber's set top terminal 102 where the data is received across the terminal's network interface 108. Exemplary set top terminals include the DCT1000, DCT1200 and DCT2000 manufactured by General Instruments, or any other set top terminal or receiver as are well known to those skilled in the art.

Software programs 114, 116, 118, and 120 are stored in memory 112 on the set top terminal 102 and used to decode and present the audio, video and other data received from the distribution network 104 on a display device 106 through the terminal's display interface 110. Software components used to present audio and video data, as well as advanced navigation and EPG features of the present invention include set top OS software 114, presentation software 116, menu software 118, and application launcher software 120. Set top operating system software 114 is used to provide the core operating system functionality of the set top terminal 102, such as basic input/output and other low-level functions. The OS software 114 also provides a framework for executing application program code, e.g., presentation 116, menu 118, and application launcher 120 software.

The set top presentation software 116 is used to present navigation tools and an electronic program guide (EPG) to the set top terminal user. The presentation software 116 fetches and displays scripts, which are pages of content, such as formatted pages of program guide data, which may be used to construct an electronic program guide. The scripts are retrieved from a data carousel 124 located on the distribution network 104 in response to user commands. According to one embodiment of the invention, the data carousel 124 is generated by a cable head end and transmitted over the cable television broadcast distribution network.

As a user manipulates an input device to request additional program guide content, e.g., through the use of a remote control or wireless keyboard, the presentation software 116 fetches the appropriate script from the data carousel 124 for presentation on the display device 106. The presentation software 116 may also be configured to display the EPG along with audio and video data being broadcast on the last channel viewed before activating the EPG. Alternatively, the presentation software 116 is configured to display the EPG along with an advertisement comprising audio and video data being broadcast on the distribution network.

In addition to EPG functionality, the presentation software 116 provides navigation tools in the form of a surf guide that is displayed to the user each time a channel is tuned. Advantageously, the surf guide may be overlaid on top of the currently tuned program for a predetermined or variable number of seconds in order to provide programming information. In keeping with some embodiments, data 122 for the surf guide generated by the presentation software 116 is retrieved from the distribution network 104 on a periodic basis, e.g., upon exceeding a time threshold after the set top power has been cycled on. This data 122 is stored in the set top memory 112 as guide data 122, which is used to populate the displays generated by the presentation software. The surf guide presents guide data 122 that comprises channel number and network identifier, program title, program start and end times, and other miscellaneous program data. According to some embodiments, the surf guide is presented in response to user selection of an appropriate control on the input device. The surf guide may be used in conjunction with directional controls, also located on the input device, to step through the guide data 122. Using the surf guide, the user may view information regarding future or past programming on the channel currently being viewed or other channels the comprise the channel map for the subscriber's distribution network.

Promotional metadata 124 is also broadcast across the distribution network in combination with programming and advertisement audio and video data. The presentation software 116 enables the electronic program guide to link to promoted programming through the user of the promotional metadata 124. Accordingly, the digital broadcast program combines a "private data" stream containing metadata that the presentation software 116 interprets as, for example, tuning information. In digital television systems, this private data is encoded into a private data packet identifier (PID). When analog embodiments of the invention are employed, this data is broadcast in the vertical blanking interval (VBI) lines of the video signal. Where the promotional metadata 124 indicates that it relates to a particular program, as interpreted by the presentation software 116, data from the local guide data 122 may be retrieved based on the program identifier supplied with the metadata 124. Furthermore, this metadata 124 may be associated with both full screen advertisements interspersed within broadcast programs, as well as advertisements presented within the electronic program guide.

Figure 2:
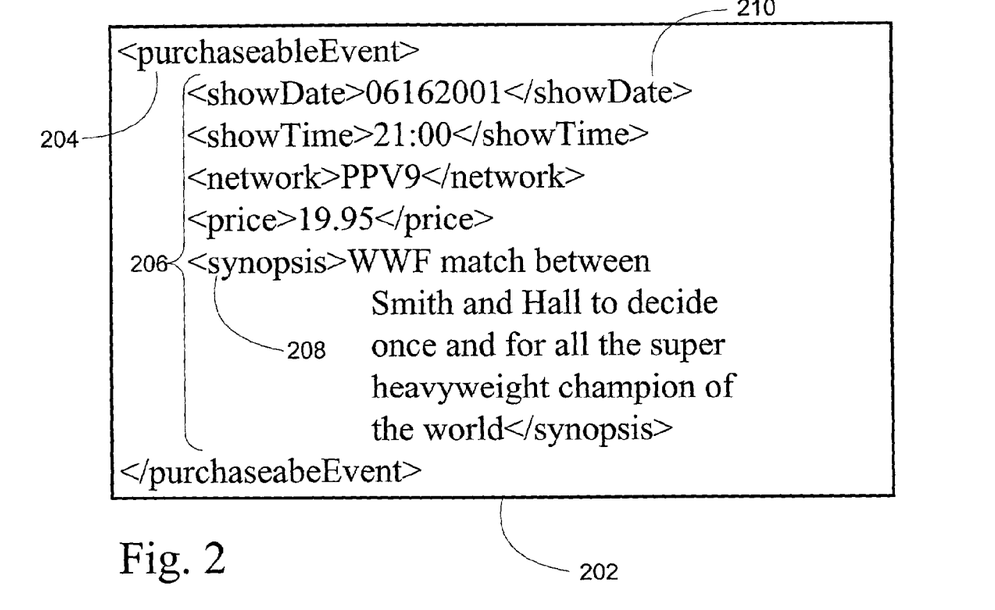
FIG. 2 is a data file presenting metadata structured according to one embodiment of the present invention.
Figure 3:
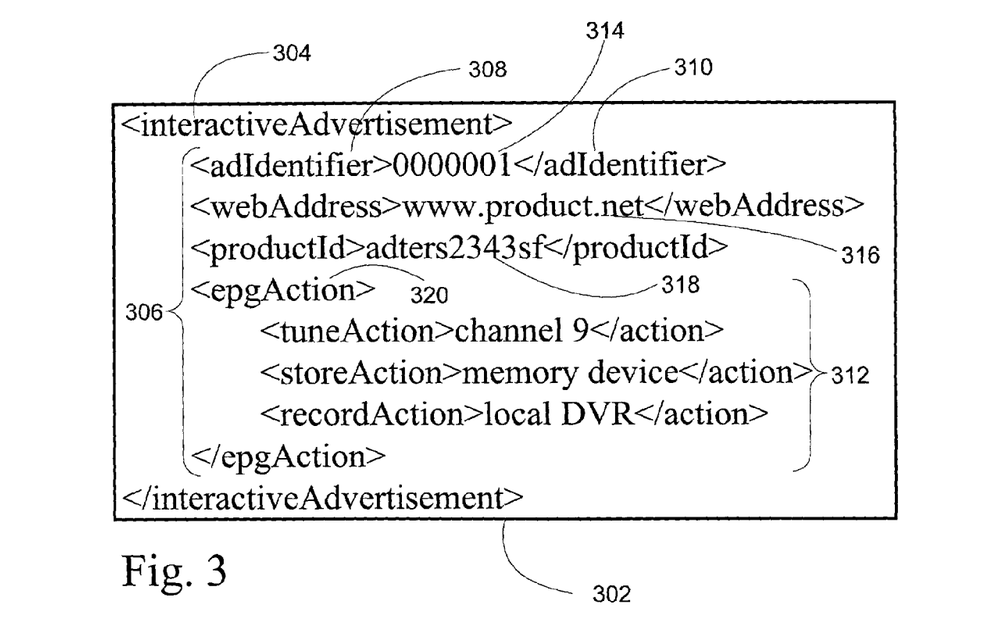
FIG. 3 is a data file presenting metadata structured according to another embodiment of the present invention.

Data files illustrating promotional metadata structured according to various embodiments of the present invention are presented in FIGS. 2 and 3. Turning to FIG. 2, a promotional metadata file 202 comprises a number of tagged data items 206. Each data item comprising the promotional metadata file 202 comprises a tag marking the beginning 208 and end 210 of the data item. The tags are used to mark up the data into a structured form, e.g., a nested structure of tagged data items. Accordingly, the data file's type is defined by the opening tag 204. The data file presented in the present illustration is defined as a purchasable event 204, for example, a full screen or EPG advertisement for a pay-per-view program. The body of the data file 206 is enclosed within the opening and ending tags. The presentation software uses these data 206 as parameters to purchase and tune the program being promoted, as well as assist in driving the interactive functionality of the EPG within the broadcast advertisement, as is explained in greater detail herein.

FIG. 3 presents an alternative promotional metadata file. As defined by the opening tag 304 of the data file 302, the metadata is associated with an interactive advertisement, for example, an interactive full screen advertisement. Nested within the defining tag 304 are the data elements of the data file 306. As was the case in the data file presented in FIG. 2, each data element is grouped between an opening 308 and closing 310 tags that are used to delimit each data item. The data items 306 defined by this data file 302, include, but are not limited to, an advertisement identifier 314, a web address 316, a unique product identifier 318, and valid EPG actions 312. The tags defining valid EPG actions 312 are grouped within closing and ending tags 320. The promotional metadata file may also comprise channel, timing and other data relating to the advertisement.

An EPG action tag 320 creates another level of nesting within the promotional metadata file 312 whereby each tag entry at this level of nesting is used to define an EPG action that is available from within the broadcast advertisement and parameters therefor. According to embodiments of the invention, these data associated with tags nested within an EPG action tag are generally referred to as EPG action parameters. Additional tags with nested data items may be used to define additional classes of data. EPG actions include, but are not limited to tuning the set top terminal to a channel to watch a program being advertised, creating a reminder in an electronic program guide for a program airing in the future, purchasing a PPV event, storing the advertisement, and accessing related on-line content.

Returning to FIG. 1, menu software 118 is stored in the set top terminal's memory 112 and provides a menu-based interface for configuring the present system. Menu software 118 responds to commands provided by the user through the use of an input device. Through the menu interface provided by the menu software 118, a user is able to customize features of the operating system 114 and presentation software 116, as well as other software components resident on the set top terminal 102. For example, using the menu software 118, a user is capable of setting parental passwords, setting purchase passwords, and locking or unlocking channels. The menu software 118 may also be used to generate lists of favorite channels, which may be activated and traversed by the user. Indeed, the menu software is constructed to allow configuration of all aspects of audio and video presentation as well as the full screen EPG and surf guides generated by the presentation software 116.

Also provided is an application launcher software module 120, which is responsible for launching other software and program code that the set top terminal requires to render certain types of content that may be resident in the terminal's memory 112. A user interacts with the set top terminal presentation software 116, through the use of navigation tools such as the surf guide and the full screen electronic program guide, to access broadcast programming and advanced EPG features from within advertisements and other promotionals. Certain advanced functionality provided by the EPG must be executed when the user interacts with advertisements to access EPG functionality. For example, a user may instruct a web address to be accessed while watching a broadcast advertisement, requiring a connection to the web site to be accessed. The application launcher 120 comprises program code required to instantiate run time sessions, other supporting code, or communication channels.

As one skilled in the art should readily recognize, a variety of programming languages, paradigms, and tools may be used to create the software components of the present invention 114, 116, 118, and 120. These software components may be presented as a single, unified software component or, alternatively, broken into additional functionally targeted software components according to various embodiments of the invention. Furthermore, the data files presented herein 122 and 124 may be implemented utilizing any number and type of data structures including, but not limited to, tab delimited files, comma delimited files, tables within a relational database, objects within an object oriented database, or structures within a hybrid relational-object database.

Figure 4:
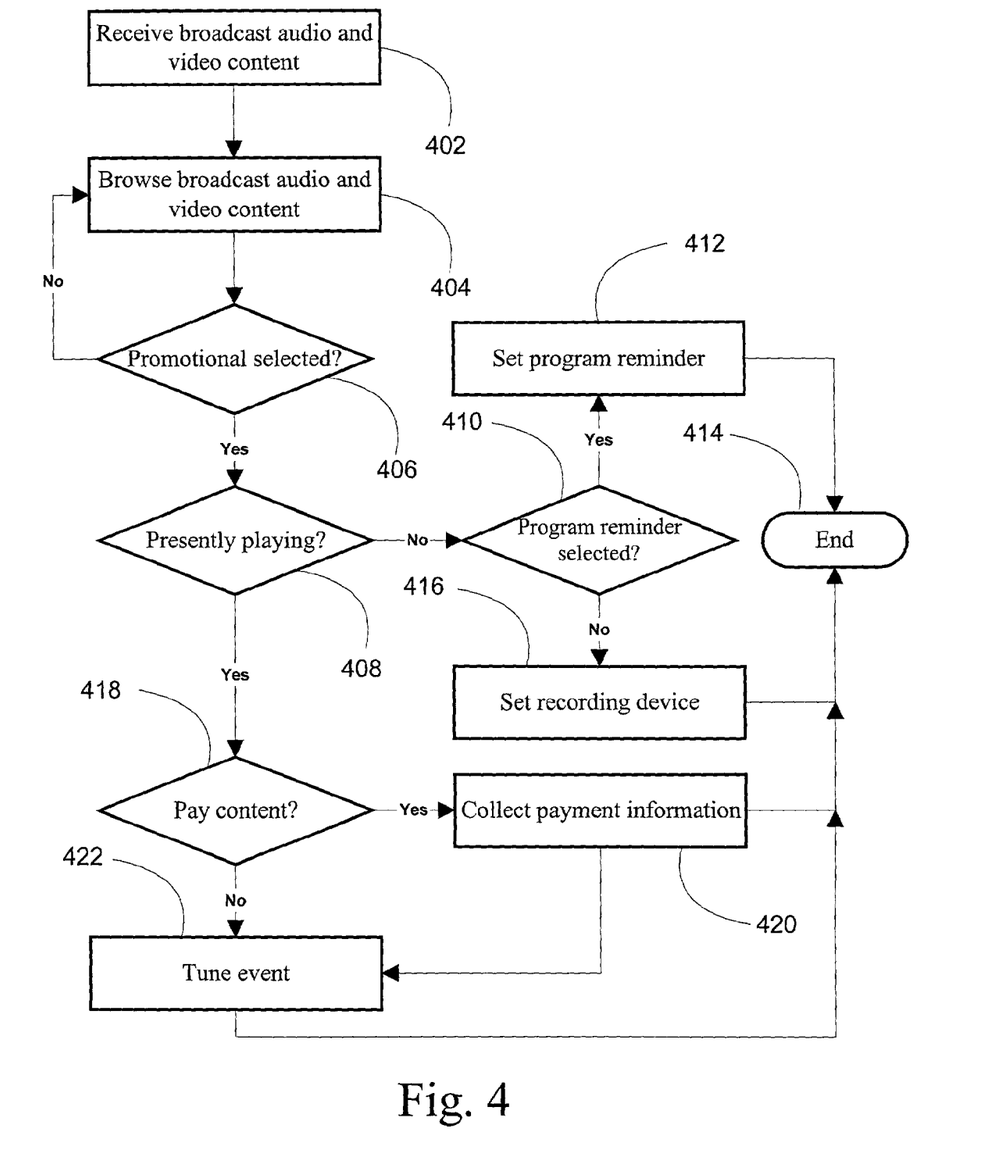
FIG. 4 is a flow diagram presenting a process for receiving metadata to provide access to the interactive features of an electronic program guide from within broadcast advertisements according to one embodiment of the present invention.

One embodiment of a method of operating the system presented in FIG. 1 in combination with the exemplary promotional metadata files of FIGS. 2 and 3 in order to provide access to the interactive features of an electronic program guide from broadcast advertisements is presented in FIG. 4. A set top terminal or other digital access device is used to receive audio and video data broadcast on a distribution network, step 402. A user uses an input device, such as a remote control or wireless keyboard, to navigate the programming broadcast on the distribution network, step 404. The terminal software, for example, presentation software, monitors user input to determine whether the user has selected a promotional advertisement, step 406. According to some embodiments, the user selects a promotional advertisement by depressing or activating a control on an input device, for example, an "select" control. Where the user has not selected a promotional advertisement, either a full screen advertisement or advertisement presented through the electronic program guide, the software continues to monitor for a user selection, steps 404 and 406.

When the software identifies that the user has selected a promotional advertisement, step 406, a check is performed to determine if the program being advertised is presently playing, step 408. The promotional metadata broadcast with the advertisement is parsed or the data items contained therein traversed to identify this and other information. For example, where the promotional metadata defines a program specific advertisement, guide data comprising enhanced programming information may be accessed and the data contained therein used in conjunction with the data contained in the promotional metadata. Accordingly, this guide data may be used to determine program start and end times when not provided as part of the promotional metadata, or to determine a programs total running time.

If the program is not currently playing, e.g., the program is playing on a future time and/or date, a check is performed to determine if the user has elected to set a reminder for the program in the electronic program guide, step 410. The selections 410 of the present method may be performed through interaction with on screen graphical controls presented on the display device. If the user indicates that a reminder is to be set, step 412, a reminder event or future force tune event is set in the memory of the terminal initialized with data comprising the broadcast metadata. If the user has not indicated that a reminder is to be set, a recording device is set in order to record the program, step 410. The data extracted from the broadcast promotional metadata is used as parameters to program the recording the device, step 416, and the program ends, step 414.

Returning to step 408, a check is performed to determine whether the program associated with the promotional advertisement is presently playing. The software performs the check by examining the promotional metadata broadcast with the advertisement. If the program is presently playing, step 408, the metadata is examined to determine if the program comprises pay content, e.g., payment is required to view the program, step 418. Where the content is not pay content, step 418, the channel defined by the metadata is tuned, step 422, and the method concludes, step 414. If the program is pay content, a series of dialogs are presented to the user in order to collect and/or verify payment information from the user, step 420. Once payment is verified, the channel defined by the metadata is tuned, step 422, and the method concludes, step 414.

Figure 5:
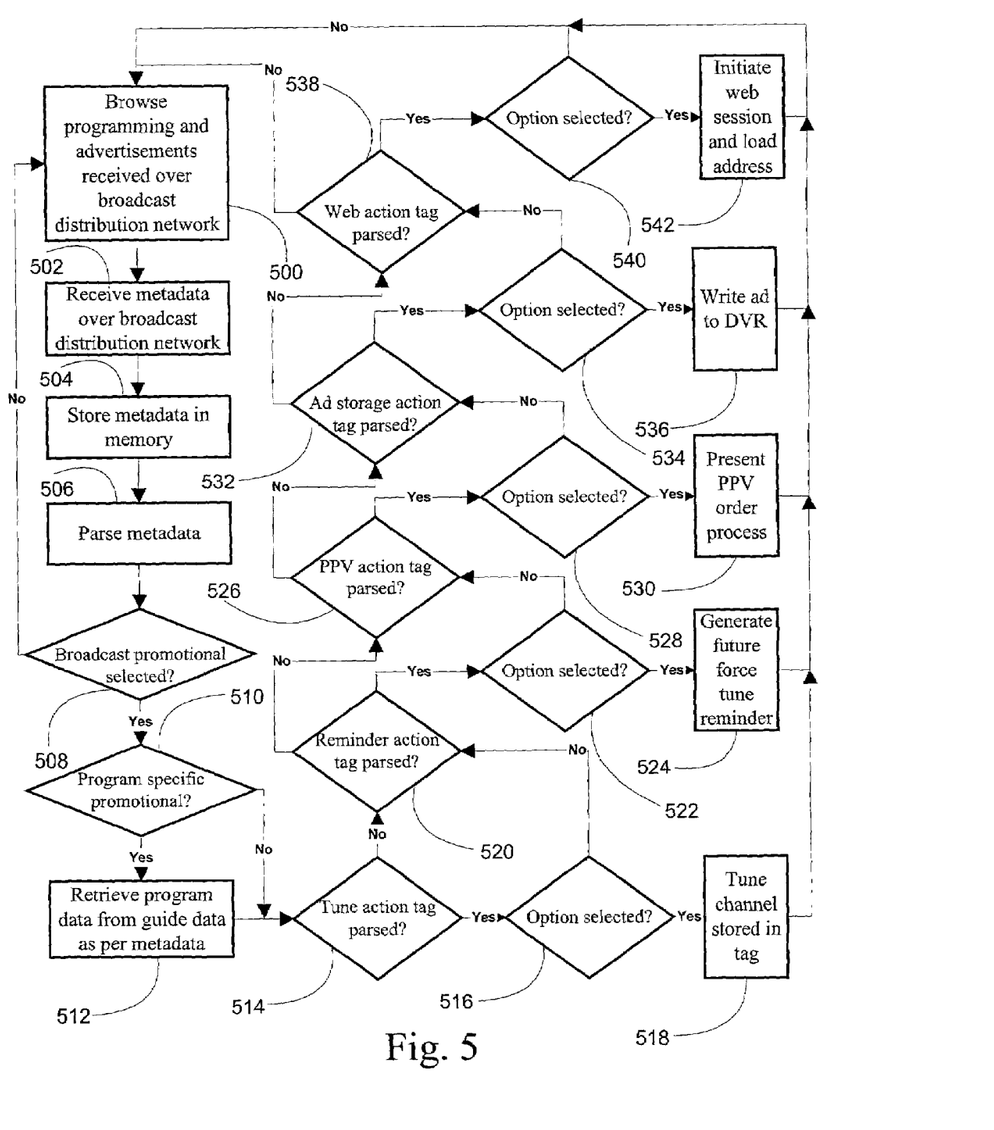
FIG. 5 is a flow diagram presenting a process for receiving metadata to provide access to the interactive features of an electronic program guide from within broadcast advertisements according to another embodiment of the present invention.

Another embodiment of a method of operating the system presented in FIG. 1 in combination with the promotional metadata files of FIGS. 2 and 3 in order to provide access to the interactive features of an electronic program guide from broadcast advertisements is presented in FIG. 5. A broadcast distribution network is used to broadcast audio and video data to a subscriber's set top terminal where a user uses an input device, such as a remote control or wireless keyboard, to navigate the programming broadcast on the distribution network, step 500. Along with the programming and advertising broadcast over the distribution network, the set top terminal receives promotional metadata that is combined with the programming data, step 502. The terminal stores the metadata in memory, step 504, where it is parsed to extract the metadata regarding the promotional currently being viewed, step 506. The promotion metadata includes, but is not limited to, unique identifier of the advertisement, address of an associated web site, unique product identifier, and a force tune channel identifier. The data may also include EPG functions that are made available within the promotional advertisement.

A check is performed to determine if a broadcast promotional advertisement has been selected, step 508. This check is performed when an advertisement is selected that is being broadcast both within the context of an electronic program guide or a full screen broadcast advertisement. If the user has not selected the advertisement, program flow returns to step 500 where the process is re-executed. Where the advertisement has been selected, a check is performed to determine if the advertisement selected is a program specific promotional, step 510. If so, program information is retrieved from the guide data used to present programming information as a user navigates among channels, step 512.

The presentation software uses the parsed metadata to determine the electronic program guide controls that may be presented and used in conjunction with the broadcast advertisement. At step 514, a check is performed to determine if a channel tune action tag is has been parsed. If the tag is parsed, an associated graphical control presents the option of executing the force tune, step 516, which causes the channel EPG action parameter to be passed to the presentation software to tune the channel when selected, step 518. A message may be presented to the user indicating that a "last" control may be activated to return to the previous channel after the new channel is tuned.

If the tune action tag has not been parsed, step 514, or the option is not selected, step 516, a check is performed to determine if a reminder action tag has been parsed, step 520. If the tag is parsed, step 520, an associated graphical control presents the option of setting the reminder, step 522, which causes the channel and program start and end time EPG action parameters to be passed to the presentation software so that a reminder is set when selected, step 524. According to some embodiments, the reminder event data is maintained on the set top terminal. Alternatively, the reminder event is maintained at the head end and broadcast to terminals over the distribution network through use of the data carousel. Also, the terminal may verify that the target channel is available on the channel map and display and error if the channel is not available.

If the reminder action tag has not been parsed, step 520, or the option is not selected, step 522, a check is performed to determine if a PPV action tag is has been parsed, step 526. If the tag is parsed, step 526, an associated graphical control presents the option of tuning the PPV program, step 528. When selected, step 530, the PPV channel EPG action parameter is passed to the presentation software causing the PPV channel to be tuned and the PPV ordering process to be initiated. The event's price, show time, and PPV channel may be displayed along with program description information extracted from the set of guide data used to populate the navigation controls. Additional show times or replays may also be displayed. According to some embodiments, controls are provided to allow the user to set a reminder for the PPV event.

If the PPV action tag has not been parsed, step 526, or the option is not selected, step 528, a check is performed to determine if an advertisement storage action tag is has been parsed, step 532. If the tag is parsed, step 532, an associated graphical control presents the option of saving the advertisement to a storage device, step 534. When selected, step 536, a storage EPG action parameter is passed to the presentation software causing the terminal to write the advertisement to a storage device defined by the user or the metadata. In distribution networks that support headend digital video recording (DVR), the advertisement may be stored on servers at the headend in space allocated to the subscriber. In distribution networks where the DVR functionality is located at the set top terminal, the advertisement is stored on the set top terminal. Advantageously, the EPG may have one or more screens, the screens comprised of scripts fetched off the network from the data carousel, enabling a user to select and watch previously recorded advertisements. Options for retention of recorded advertisements, as well as deletion or archiving may be provided through EPG scripts.

If the advertisement storage action tag has not been parsed, step 532, or the option is not selected, step 534, a check is performed to determine if a web action tag is has been parsed, step 538. If the tag is parsed, step 538, an associated graphical control presents the option of accessing a web site associated with the selected advertisement, step 540. When selected, step 542, a web EPG action parameters is passed to the presentation software instructing the terminal's application launcher software to open or initiate a communication channel to the Internet. Alternatively, the communication channel may be opened with a network defined in the promotional metadata. For set top terminals that support picture-in-picture (PIP), the channel viewed when the communication channel is opened is displayed in the PIP window with the web session occupying the majority of the display device's viewable area. After the selected EPG option presented to the user is selected, steps 518, 524, 530, 536, and 542, program flow returns to step 500 where the user is free to continue navigating among the programming broadcast over the distribution network.

Figure 6:
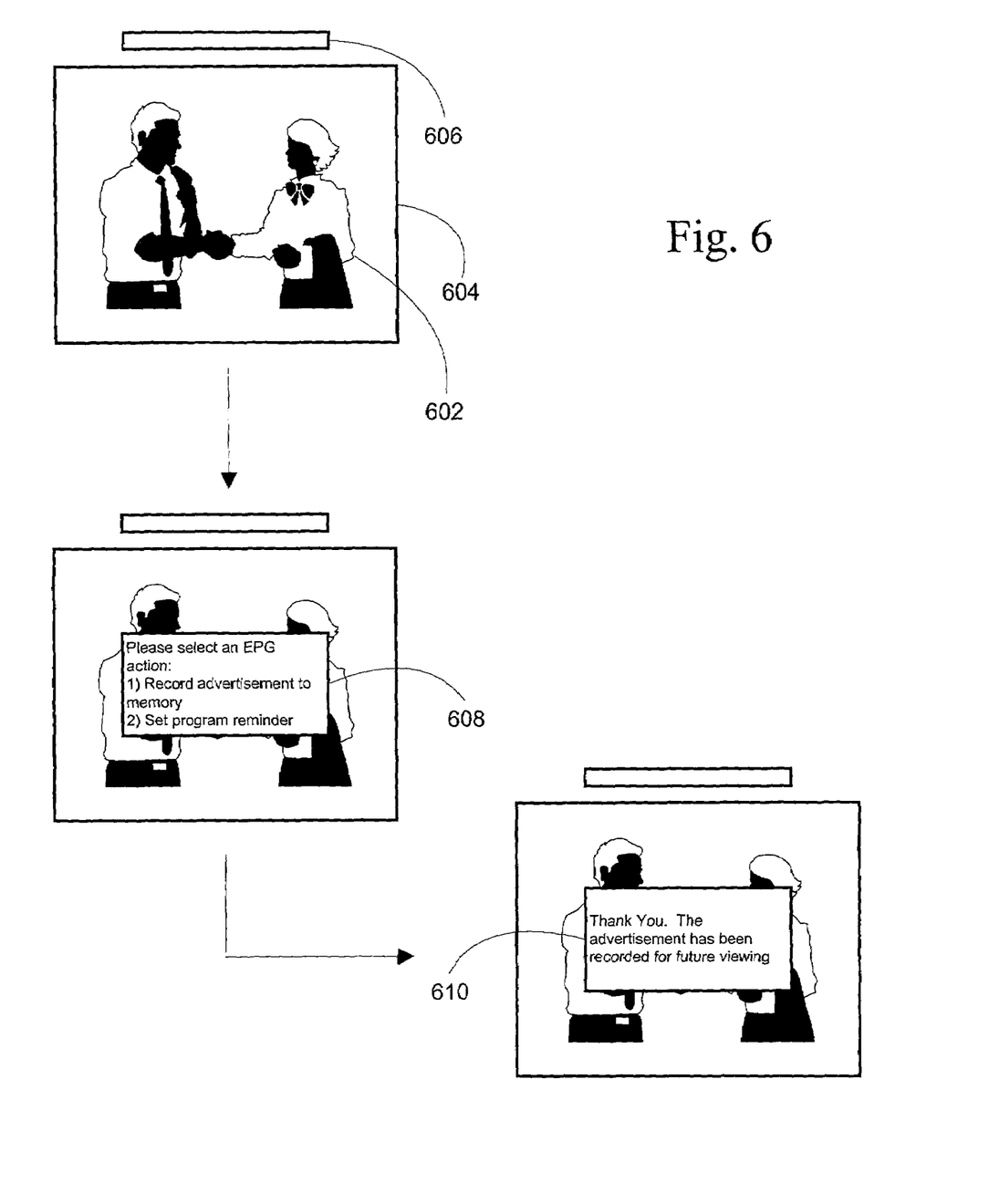
FIG. 6 is a block diagram presenting a sequence of exemplary screen shots illustrating the process of accessing EPG features from within a broadcast advertisement.

FIG. 6 presents a sequence of exemplary screen shots demonstrating the on screen displays generated by the system and method of the present invention presented in FIGS. 1 through 5. Advertisement or other promotional programming 602 is distributed by a content provider over a distribution network for presentation on a display device 604. A set top terminal 606 is used to decode programming information and metadata. When viewing a promotional, the user may select a key or other control on an input device in order to access EPG features of the presentation software stored on the set top terminal 606. Selection of this control causes the presentation software to parse the metadata associated with the promotional to determine the EPG functions that are available 608. In the present example, the metadata instructs the presentation software that two EPG functions are available: recording the advertisement to memory or setting a program reminder. The user selects one of the options presented and the presentation software generates a confirmation dialog to alert the user that the command has been executed 610.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A data structure stored on computer readable media in a set top terminal, the data structure comprising:
   one or more data tags, each data tag used to provide information regarding a broadcast advertisement interspersed within broadcast programs or presented within an electronic program guide, wherein said broadcast advertisement comprises audio and video data; and
   one or more electronic program guide action tags, each electronic program guide action tag used to define a valid electronic program guide feature that may be accessed from within the broadcast advertisement, the electronic program guide feature being related to at least one of the broadcast advertisement and a program associated with the broadcast advertisement;
   the data structure operative to provide a link between the broadcast advertisement and the electronic program guide to provide access to electronic program guide features defined by the electronic program guide action tags from within the broadcast advertisement, the electronic program guide being represented by a signal generated by a set top terminal using software programs stored in a memory of the set top terminal, wherein the software programs at the set top terminal interpret the data structure to provide the link and determine electronic program guide controls that is presented and used in conjunction with the broadcast advertisement, wherein the data structure is formatted in combination with the broadcast advertisement for broadcast to the set top terminal.

2. The data structure of claim 1 wherein each of the one or more electronic program guide action tags are marked by an opening and a closing tag, the opening and closing tag operative to define a data type for each of the one or more electronic program action tags.

3. The data structure of claim 2 wherein the opening and closing tag enclose the valid electronic program guide feature in order to delimit the valid electronic program guide feature from another valid electronic program guide feature.

4. The data structure of claim 3 wherein the valid electronic program guide feature comprises an electronic program guide action parameter of a data type corresponding to the opening and closing tag.

5. The data structure of claim 4 wherein the electronic program guide action parameter comprises a location to store the broadcast advertisement.

6. The data structure of claim 5 wherein the electronic program guide action parameter comprises a local location to store the broadcast advertisement.

7. The data structure of claim 5 wherein the electronic program guide action parameter comprises a remote location to store the broadcast advertisement.

8. The data structure of claim 4 wherein the electronic program guide action parameter comprises pay-per-view purchase information.

9. The data structure of claim 4 wherein the electronic program guide action parameter comprises information to set a future reminder for a program.

10. The data structure of claim 4 wherein the electronic program guide action parameter comprises a network address.

11. The data structure of claim 10 wherein the network address is an Internet address.

12. The data structure of claim 1 wherein the one or more data tags comprises pay-per-view information.

13. The data structure of claim 12 wherein the pay-per-view information comprises program date information.

14. The data structure of claim 12 wherein the pay-per-view information comprises program time information.

15. The data structure of claim 12 wherein the pay-per-view information comprises program channel information.

16. The data structure of claim 1 wherein the one or more data tags comprises a unique advertisement identifier.

17. The data structure of claim 16 wherein the identifier comprises a key to locate additional program information from a set of guide data.

18. The data structure of claim 1 wherein the one or more data tags comprises a unique product identifier.

19. The data structure of claim 18 wherein the identifier comprises a key to locate additional program information from a set of guide data.

20. A method, comprising:
   receiving, at a set top terminal, an advertisement broadcast on a distribution network interspersed within broadcast programs or presented within an electronic program guide, the advertisement comprising audio and video data, wherein the metadata is formatted in combination with the advertisement for broadcast to the set top terminal;
   receiving, at the set top terminal, metadata associated with the advertisement, the metadata containing one or more advertisement data tags and one or more electronic program guide action tags, the advertisement data tags comprising data items related to the advertisement, the electronic program guide action tags comprising data items related to interactive features of the electronic program guide associated with at least one of the advertisement and a program related to the advertisement the electronic program guide being represented by a signal generated by the set top terminal using software programs stored in a memory of the set top terminal, wherein the software programs at the set top box interpret the metadata and determine the electronic program guide controls that are presented and used in conjunction with the advertisement; and
   accessing the interactive features of the electronic program guide using the metadata.

* * * * *